(12) United States Patent
Chai et al.

(10) Patent No.: US 9,587,055 B2
(45) Date of Patent: Mar. 7, 2017

(54) COPOLYMERS

(75) Inventors: Choon Kooi Chai, Overijse (BE); Dominique Jan, Beaufays (BE)

(73) Assignee: INEOS MANUFACTURING BELGIUM NV, London (GB)

( * ) Notice: Subject to any disclaimer, the term of this patent is extended or adjusted under 35 U.S.C. 154(b) by 398 days.

(21) Appl. No.: 12/736,926

(22) PCT Filed: Jun. 4, 2009

(86) PCT No.: PCT/EP2009/056882
§ 371 (c)(1),
(2), (4) Date: Nov. 23, 2010

(87) PCT Pub. No.: WO2010/000557
PCT Pub. Date: Jan. 7, 2010

(65) Prior Publication Data
US 2011/0086191 A1    Apr. 14, 2011

(30) Foreign Application Priority Data

Jun. 9, 2008 (EP) .................................... 08157848

(51) Int. Cl.
| F16L 9/12 | (2006.01) |
| C08F 210/16 | (2006.01) |
| C08F 4/76 | (2006.01) |
| F16L 9/127 | (2006.01) |
| C08F 4/659 | (2006.01) |
| C08F 4/6592 | (2006.01) |

(52) U.S. Cl.
CPC ............ *C08F 210/16* (2013.01); *F16L 9/127* (2013.01); *C08F 4/6592* (2013.01); *C08F 4/65916* (2013.01); *C08F 2410/02* (2013.01); *Y10T 428/139* (2015.01)

(58) Field of Classification Search
CPC  C08F 210/16; C08F 4/65912; C08F 4/65908; C08F 4/65916; C08F 2500/12; C08F 2500/17; C08F 2500/19; F16L 9/127; Y10T 428/139
USPC .... 428/35.7, 36.9; 526/160, 170, 348.5, 126
See application file for complete search history.

(56) References Cited

U.S. PATENT DOCUMENTS

| 5,395,471 | A | 3/1995 | Obijeski et al. |
| 6,355,757 | B2 | 3/2002 | Garcia-Franco et al. |
| 7,153,909 | B2 | 12/2006 | Van Dun et al. |
| 2004/0198911 | A1 | 10/2004 | Van Dun et al. |
| 2005/0228139 | A1 | 10/2005 | Lee et al. |

FOREIGN PATENT DOCUMENTS

| EP | 1 760 096 A1 | 3/2007 |
| EP | 1 764 389 A1 | 3/2007 |
| EP | 1 767 556 A1 | 3/2007 |
| EP | 1 927 627 A1 | 6/2008 |
| EP | 2 133 367 A1 | 12/2009 |
| WO | WO 93/08221 A2 | 4/1993 |
| WO | WO 00/64967 A1 | 11/2000 |
| WO | WO 03/020821 A1 | 3/2003 |
| WO | WO 2005/019333 | 3/2005 |
| WO | WO 2005/019333 A1 | 3/2005 |
| WO | WO 2005/049665 A1 | 6/2005 |
| WO | WO 2006/053709 A1 | 5/2006 |
| WO | WO 2006/085051 | 8/2006 |
| WO | WO 2006/085051 A1 | 8/2006 |
| WO | WO 2006/120418 | * 11/2006 |
| WO | WO 2007/022908 A2 | 3/2007 |
| WO | WO 2007/022908 A3 | 3/2007 |
| WO | WO 2008/074689 A1 | 6/2008 |
| WO | WO 2008/124557 | 10/2008 |
| WO | WO 2008/124557 A1 | 10/2008 |
| WO | WO 2009/101124 | 8/2009 |
| WO | WO 2009/101124 A1 | 8/2009 |

OTHER PUBLICATIONS

Dowlex 2388 Polyethylene Resin, Technical Information Sheet, 2 pages, Sep. 2007 (D6).
Dowlex™ PE-RT FAQ, 6 pages, Feb. 2013 (D9).
Dowlex 2740G Technical Information—Blown Film Resin, 2 pages, Sep. 30, 2015 (D16).
The Dow Chemical Company, Certificate of Analysis (COA) 1980182, 1 page, Mar. 9, 2015 (D17).
Dow Chemical Iberica S.L., Invoice No. 09/45039882, 3 pages, Mar. 9, 2015 (D18).
The Dow Chemical Company, Certificate of Analysis (COA) 2008313, 1 page, Mar. 9, 2015 (D19).
The Dow Chemical Company, Certificate of Analysis (COA) 1981505, 1 page, Mar. 9, 2015 (D20).
The Dow Chemical Company, Certificate of Analysis (COA) 1981603, 1 page, Mar. 9, 2015 (D21).
Dow chemical Iberica S.L., Invoice No. 09/45038752, 2 pages, Mar. 9, 2015 (D22).
Declaration of Mark S. Johnson Relating to Dowlex™ 2740G Polyethylene Resin and EP 2,285,843B1, 16 pages, Mar. 9, 2015 (D23).
Declaration of Jian Wang Relating to Dowlex 2740G Polyethylene Resin and EP 2,285,843B1, 3 pages, Mar. 9, 2015 (D24).
Declaration of Mark S. Johnson Relating to U.S. Pat. No. 5,395,471 and EP 2,285,843B1, 39 pages, Mar. 9, 2015 (D26).
Declaration of Jian Wang Relating to U.S. Pat. No. 5,395,471 and EP 2,285,843B1, 5 pages, Mar. 9, 2015 (D27).

\* cited by examiner

*Primary Examiner* — Yan Lan
(74) *Attorney, Agent, or Firm* — Nixon & Vanderhye P.C.

(57) ABSTRACT

Copolymers comprising ethylene and alpha-olefins having (a) a density (D) in the range 930-960/g/m³ (b) a melt index (MI$_2$) in the range 0.1-3.5 g/10 min (c) a melt elastic modulus G' (G"=500 Pa) in the range 40 to 150 Pa, and (d) a ratio of complex dynamic shear viscosities $\eta*(0.1)/\eta(100)$ in the range 1.5 to 5.5. The copolymers are suitable for use as Polyethylenes of Raised Temperature Resistance (PE-RT) for use in hot water piping systems. The copolymers may be prepared by use of meltallocene catalyst systems. Pipes having a time to failure of ≥500 hrs measured according to ISO 1167 at 110° C. and 2.6 MPa prepared in a single reactor are also disclosed.

24 Claims, No Drawings

COPOLYMERS

This application is the U.S. national phase of International Application No. PCT/EP2009/056882 filed 4 Jun. 2009 which designated the U.S. and claims priority to European Application No. 08157848.6 filed 9 Jun. 2008, the entire contents of each of which are hereby incorporated by reference.

The present invention relates to novel copolymers of ethylene and α-olefins and in particular to copolymers suitable for use as Polyethylenes of Raised Temperature Resistance (PE-RT) for use in hot water piping systems and similar.

In the past polyethylene materials were cross-linked in order to achieve the desired high temperature requirements in particular long term strength for use in hot water pipe applications.

Monomodal polyethylenes such as medium density (MDPE) having densities in the range 930-942 kg/m$^3$ and high density polyethylenes (HDPE) having density in the range 945-965 kg/m$^3$ have been used for applications in the temperature range of about 0° C. to about 50° C.

High density polyethylene (HDPE) in particular is known to have a good mechanical strength at elevated temperatures and has been used in packaging applications where a good high temperature performance is required. However the long term hydrostatic strength characteristics of non crosslinked HDPE materials at higher temperatures are often unsuitable for applications such as hot water pipes.

These PE-RT type materials have been used successfully for many years in domestic and industrial hot water piping systems and also as part of underfloor heating and radiator connections. More recently the easy processing and outstanding material properties have made such materials useful in larger diameter industrial applications where normal polyethylene materials cannot be used due to high temperature limitations.

For such applications the required technical attributes of the polymers are excellent creep resistance at high temperature, good heat stability in chlorinated water environments, good processability and high flexibility.

More recently polymers having a multimodal molecular weight distribution have been used successfully for use in hot water pipe applications. Polyethylene compositions with a multimodal molecular weight distribution (MWD) for example a bimodal MWD can offer advantages compared with prior art unimodal polyethylenes. For example bimodal polyethylenes may combine the favorable mechanical properties afforded by high molecular weight polyethylene with the good processability of low molecular weight polyethylene.

Peroxide cross-linking of polymers has also been found to show some improvement in the creep resistance of the polymers at high temperature.

Prior art multimodal polyethylenes for use in pipe applications are described in WO 97/29152, WO 00/01765, WO 00/18814, WO 01/92480 and WO 01/25328. In particular EP 1425344 describes multimodal polyethylenes having a density in the range about 925 to about 950 kg/m$^3$ and melt index in the range about 0.1 to about 5 g/10 min for use in durable applications such as pipes and exhibit an excellent stress performance at higher temperatures. EP 1448702 describes pipes for hot fluids comprising multimodal polyethylenes with density in the range 921 to 950 kg/m$^3$.

WO 05/056657 describes stabilized multimodal polyethylene materials having densities >925 kg/m$^3$ which are particularly useful for pipe applications.

More recently WO 08/064,810 describes pipes having improved high temperature resistance again based on polyethylene compositions having a bimodal molecular weight distribution produced in a series of reactors.

Our earlier application WO 06/120418 describes copolymers prepared by use of metallocene catalysts having densities >930 kg/m$^3$ and melt index >4 g/10 min, suitable for use in rotomoulding applications.

We have now surprisingly found that metallocene derived copolymers having a higher density but lower melt index may suitably be used for PE-RT applications in particular for use in hot water pipe applications and importantly may be used for both monolayer and multilayer applications. Such copolymers have been found to exhibit the balance of favorable mechanical properties afforded by high molecular weight polyethylene with the good processability of low molecular weight polyethylene previously seen with multimodal polymers. In addition, excellent long-term hydrostatic strength is obtained without any crosslinking of the polyethylene material. Thus according to a first aspect of the present invention there is provided copolymers of ethylene and alpha-olefins said copolymers characterized in having (a) a density (D) in the range 930-960 kg/m$^3$
(b) a melt index (MI$_2$) in the range 0.1-3.5 g/10 min
(c) a melt elastic modulus G' (G"=500 Pa) in the range 40 to 150 Pa, and
(d) a ratio of complex dynamic shear viscosities η*(0.1)/η*(100) in the range 1.5 to 5.5.

The copolymers of the present invention typically exhibit a molecular weight distribution (Mw/Mn) in the range 3.5 to 10.

The novel copolymers of the present invention exhibit a balance of creep resistance at high temperature and a product flexibility performance characterized by the equations, $$\epsilon(100\ h) \leq -0.0919D + 89.5 \tag{e}$$

$$\epsilon(500\ h) \leq -0.124D + 119.75 \tag{f}$$

where D is the density (in kg/m$^3$), $\epsilon(100\ h)$ and $\epsilon(500\ h)$ are respectively the measured strain (in %) after 100 and 500 hours of tensile creep test at 95° C., under a constant stress of 2 MPa, in accordance to ISO 899-1:2003 using an ISO-1B type specimen which is cut from a compressed moulded plaque (ISO 293:1996, 4 mm thickness), machined (ISO2818 standard), observed and its dimensions measured (ISO 527-1:1993).

Preferably the novel copolymers of the present invention exhibit the following relationships:

$$\epsilon(100\ h) \leq -0.135D + 129.86$$

$$\epsilon(500\ h) \leq -0.149D + 143.2$$

The novel copolymers of the present invention may also be characterised by a critical frequency (Hz) of activation of high temperature performance $f_{C-HT}$ determined according to the equation $$f_{C-HT} \geq 0.85[\eta^*(0.1)/\eta^*(100)] - 0.8 \tag{g}$$

wherein $\eta^*(\omega)$ is as defined above.

Preferably $f_{C-HT} \geq 2.0$ \hfill (h)

The novel copolymers of the present invention may be further defined as having (a) a density (D) in the range 930-960 kg/m$^3$
(b) a melt index (MI$_2$) in the range 0.1-3.5 g/10 min
(c) a balance of high temperature creep resistance and products flexibility performance characterized by the equation, $$\epsilon(100\ h) \leq -0.0919D + 89.5$$

where D is the density (in kg/m³) and $\epsilon(100\ h)$ is the measured strain (in %) after 100 hours of tensile creep test at 95° C., under a constant stress of 2 MPa.

More preferably the copolymers have
(a) a density (D) in the range 930-960 kg/m³
(b) a melt index ($MI_2$) in the range 0.1-3.5 g/10 rain
(c) a balance of high temperature creep resistance and products flexibility performance characterized by the equation, $$\epsilon(100\ h) \leq -0.135D + 129.86$$

where D is the density (in kg/m³) and $\epsilon(100\ h)$ is the measured strain (in %) after 100 hours of tensile creep test at 95° C., under a constant stress of 2 MPa.

The copolymers may be further defined as having
(a) a density (D) in the range 930-960 kg/m³
(b) a melt index ($MI_2$) in the range 0.1-3.5 g/10 min
(c) a balance of high temperature creep resistance and products flexibility performance characterized by the equation, $$\epsilon(500\ h) \leq -0.124D + 119.75$$

where D is the density (in kg/m³) and $\epsilon(500\ h)$ is the measured strain (in %) after 500 hours of tensile creep test at 95° C., under a constant stress of 2 MPa.

More preferably the copolymers have
(a) a density (D) in the range 930-960 kg/m³
(b) a melt index ($MI_2$) in the range 0.1-3.5 g/10 min
(c) a balance of high temperature creep resistance and products flexibility performance characterized by the equation, $$\epsilon(500\ h) \leq -0.149D + 143.2$$

where D is the density (in kg/m³) and $\epsilon(500\ h)$ is the measured strain (in %) after 500 hours of tensile creep test at 95° C., under a constant stress of 2 MPa.

The copolymers may be further defined as having
(a) a density (D) in the range 930-960 kg/m³
(b) a melt index ($MI_2$) in the range 0.1-3.5 g/10 min
(c) a critical frequency (in Hz) of activation of high temperature performances characterised by the equation:

$$f_{C-HT} \geq 0.85 \eta^*(0.1)/\eta^*(100) - 0.8$$

More preferably the copolymers have
(a) a density (D) in the range 930-960 kg/m³
(b) a melt index ($MI_2$) in the range 0.1-3.5 g/10 min
(c) a critical frequency (in Hz) of activation of high temperature performances characterised by the equation:

$$f_{C-HT} > 2.0$$

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The copolymers according to the present invention preferably have a density in the range 930-945 kg/cm³ and more preferably in the range 933 to 940 kg/cm³ and most preferably in the range 934-938 kg/cm³.

The copolymers according to the present invention preferably have a melt index ($MI_2$) in the range 1.0 to 3.0 and preferably in the range 1.0-1.5.

The copolymers according to the present invention preferably have a melt elastic modulus G' (G"=500 Pa) in the range 40-100 and most preferably in the range 40 to 70 Pa.

The copolymers according to the present invention have a ratio of complex dynamic shear viscosities in the range 2.0-5.0 and most preferably in the range 2.5-4.5.

The copolymers according to the present invention preferably have a unimodal molecular weight distribution. By unimodal molecular weight distribution is meant a copolymer that does not contain fractions of substantially different molecular weights. By substantially different molecular weights, it must be understood that, in the case of production in several reactors in series, the difference in the molecular weight of the polymer produced in each reactor is not greater than 10%.

The copolymers of the present invention may suitably be prepared by use of a single site catalyst system for example a metallocene catalyst system comprising, preferably a monocylcopentadienyl metallocene complex having a 'constrained geometry' configuration together with a suitable cocatalyst.

Examples of monocyclopentadienyl or substituted monocyclopentadienyl complexes suitable for use in the present invention are described in EP 416815, EP 418044, EP 420-436 and EP 551277.

Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

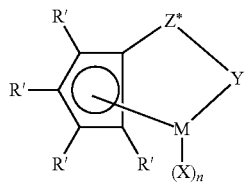

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Particularly preferred metallocene complexes for use in the preparation of the copolymers of the present invention may be represented by the general formula:

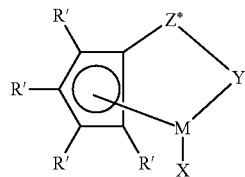

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane—or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl) dimethyl silanetitanium-$\eta^4$-1.3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

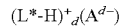

$(L^*-H)^+_d(A^{d-})$ wherein

L* is a neutral Lewis base $(L^*-H)^+_d$ is a Bronsted acid $A^{d-}$ is a non-coordinating compatible anion having a charge of d⁻, and d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri(p-tolyl)(hydroxyphenyl) borate
tris(pentafluorophenyl)(hydroxyphenyl) borate
tris(pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl)methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl)methyl ammonium tris (pentafluorophenyl)(4-hydroxyphenyl) borate.

With respect to this type of cocatalyst, a preferred compound is the reaction product of an alkylammonium tris (pentafluorophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Suitable catalysts for use in the preparation of the novel copolymers of the present invention are suitably described in WO 04/020487 and WO 05/019275.

Particularly suitable catalysts for use in the preparation of the copolymers of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The copolymers of the present invention are preferably prepared in a single reactor.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert copolymerizing medium. Suitable diluents include toluene or alkanes such as hexane, propane or copolymer. Preferred temperatures are from about 30° C. up to about 200° C. but preferably from about 60° C. to 100° C. Loop reactors are widely used in slurry copolymerizing processes.

The novel copolymers are most suitably prepared in a gas phase process.

Gas phase processes for the copolymerizing of olefins, especially for the homopolymerisation and the copolymerization of ethylene and α-olefins for example 1-butene, 1-hexene, 4-methyl-1-pentene are well known in the art.

Typical operating conditions for the gas phase are from 20° C. to 100° C. and most preferably from 40° C. to 90° C. with pressures from subatmospheric to 100 bar.

Particularly preferred gas phase processes are those operating in a fluidized bed. Examples of such processes are described in EP 89691 and EP 699213 the latter being a particularly preferred process.

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins having
 (a) a density (D) in the range 930-960 kg/m$^3$
 (b) a melt index (MI$_2$) in the range 0.1-3.5 g/10 min
 (c) a melt elastic modulus G' (G"=500 Pa) in the range 40 to 150 Pa, and
 (d) a ratio of complex dynamic shear viscosities η*(0.1)/η*(100) in the range 1.5 to 5.5
said method comprising copolymerizing ethylene and said alpha olefins in the presence of a catalyst system as hereinbefore described.

The copolymers of the present invention are particularly suitable for use as Polyethylenes of Raised Temperature Resistance (PE-RT) for use in hot water piping systems and similar.

Thus according to another aspect of the present invention there is provided a pipe comprising a copolymer of ethylene and an alpha-olefin having
 (a) a density (D) in the range 930-960 kg/m$^3$
 (b) a melt index (MI$_2$) in the range 0.1-3.5 g/10 min (c) a melt elastic modulus G' (G"=500 Pa) in the range 40 to 150 Pa, and (d) a ratio of complex dynamic shear viscosities η*(0.1)/η*(100) in the range 1.5 to 5.5

The suitability of resins for such applications is subject to product standards and performance requirements for example DIN (German Industrial Norm or Deutsche Industre Norm) or those defined by ISO (International Organization for Standardization, Geneva, Switzerland). In respect of the present invention the standard EN ISO 22391 has been used to determine the suitability of the resins for hot water pipe applications In another embodiment, inventive compositions are also suitable for the manufacture of pipe articles having an MRS classification (Minimum Required Strength at 20° C. for 50 years) according to standard ISO12162 of at least 8.0 MPa.

Pipes according to the present invention may be suitably defined in terms of the time to failure according to hydrostatic tests in accordance with the complete teaching of ISO 1167 standard.

Thus according to another aspect of the present invention there is provided a pipe having a time to failure according to ISO 1167 of ≥500 hours at 110° C. and 2.6 MPa said pipe comprising a copolymer of ethylene and an α-olefin produced in a single reactor.

The novel copolymers of the present invention are most suitably used together with additive packages which operate synergistically for the environment of a pipe for use in for example chlorinated water supply. For example antioxidants and other additives may be chosen for performance with respect to the atmosphere external to the pipe and also for performance with respect to the chlorine exposure in the interior of the pipe.

A first antioxidant comprising phosphites or phosphonites such as tris (2,4-ditert-butylphenol) phosphite (Irgafos™ 168) is advantageously used in the formulation. The composition preferably contains from 0.01 to 0.3 part of the first antioxidant per 100 parts of polymer, more preferably from 0.02 to 0.2 part, contents from 0.05 to 0.15 part being particularly preferred.

A second class of specific antioxidants that provides efficient protection to long term ageing particularly when exposed to water medium can also be advantageously used. For instance, low polarity hindered phenols bearing non-hydrolysable organic functions are suitable to guarantee a good dispersion of the antioxidant in the polymer matrix, but also excellent long term stability and low leaching of additive by-products in the aqueous medium. Other antioxidants with slow kinetic of hydrolysis like hydroxylamines, hindered amines light stabilizers (like derivatives of 2,2,6,6-tetramethyl piperidine) or thiosynergists organosulfides (like distearyl thiodipropionate) can also be used. Among the different antioxidants, specific hindered phenols like 3,3',3",5,5',5"-hexa-tert-butyl α,α', α"-(mesitylene-2,4,6-trityl) tri-p-cresol (Irganox™ 1330, Ethanox™ 1330) or 1,3, 5-tris(3,5-di-tert-butyl-4-hydroxybenzyl)-1,3,5-triazine-2,4,6(1H,3H,5H)-trione (Irganox™ 3114) are preferred. Irganox™ 1330 is particularly preferred. The composition preferably contains from 0.05 to 1 part of the second antioxidant per 100 parts of polymer, more preferably from 0.1 to 0.5 part, contents from 0.15 to 0.30 part being particularly preferred.

A metal deactivator such as, for example N,N'-bis(3,5-di-t-butyl-4-hydroxyphenylpropionyl)hydrazine, N,N'-diphenyloxamide, N-salicylal-N'-salicyloyl-hydrazine, N,N'-bis(salicyloyl)hydrazine, 3-salicyloylamino-1,2,4-triazole, bis (benzylidene)oxallyl dihydrazide, oxanilide, isophthaloyl dihydrazide, sebacoyl bisphenylhydrazide, N,N'-diacetyladipoyl dihydrazide, N,N'-bis(salicyloyl)oxallyl dihydrazide, N,N'-bis(salicyloyl)thiopropionyl dihydrazide, is also advantageously used in the composition. N,N-bis(3,5-di-t-butyl-4-hydroxyphenylpropionyl)hydrazine (Evernox™ MD 1024). The composition preferably contains from 0.01 to 0.3 part of metal deactivator per 100 parts of polymer, more preferably from 0.02 to 0.2 part, contents from 0.05 to 0.15 part being particularly preferred.

Optionally, a third antioxidant may be used in the additive package. This third antioxidant is generally a hindered phenol bearing hydrolysable organic function for example Irganox™ 1010, Irganox™ 1076, or Cyanox™ 1790. The composition preferably contains less than 0.3 part of the first antioxidant per 100 parts of polymer, more preferably less than 0.2 part, contents of less than 0.1 part being particularly preferred.

Optionally, an acid scavenger may also be used in the formulation. Metal soaps, metal oxide or hydrotalcite are known to be suitable acid scavenger. When such an acid scavenger is used, metal soaps like zinc stearate or calcium stearate or metal oxide like zinc oxide are preferred. Zinc oxide is the most preferred acid scavenger. The composition preferably contains less than 0.25 part of acid scavenger per 100 parts of polymer, more preferably less than 0.15 part, contents of less than 0.1 part being particularly preferred.

In addition processing aids, UV stabilizers, pigments or colorants may also be used in the additive package.

A typical additive package comprises 0.1 parts of the first antioxidant (Irgafos™ 168), 0.25 parts of the second antioxidant (Irganox™ 1330), 0.1 part of metal deactivator (Evernox™ MD 1024) and 0.05 parts of acid scavenger (zinc oxide) per 100 parts of the polymer composition.

Thus according to another aspect of the present invention there is provided a pipe comprising a copolymer of ethylene and an alpha-olefin having (a) a density (D) in the range 930-960 kg/m$^3$ (b) a melt index (MI$_2$) in the range 0.1-3.5 g/10 min (c) a melt elastic modulus G' (G"=500 Pa) in the range 40 to 150 Pa, and (d) a ratio of complex dynamic shear viscosities η*(0.1)/η*(100) in the range 1.5 to 5.5 and an antioxidant system comprising (a) a single hindered phenol (b) at least one phosphite and (c) at least one metal deactivator.

The present invention will now be further illustrated by reference to the following examples.

EXPERIMENTAL

Example 1

1—Catalyst Preparation (a) Treatment of Silica with Triethylaluminium (TEA)

Under continuous agitation, 1491 L of isohexane and 397 kg of silica D948 (available from W.R. Grace), were added to a reactor. (The silica had been previously calcined under nitrogen to reach a level of hydroxyl groups of 1.53 mmol/g). 19.3 kg of an Octastat 2000 (available from Innospec) solution in pentane (2 g/l) was then added and the mixture was stirred for 15 minutes. 571 kg of a 12% triethylaluminium (TEA) solution in isohexane was then slowly added over 1 hour and the mixture was stirred for 1 hour further at 30° C. The slurry was filtered and thoroughly washed with isohexane before being transferred to a dryer. 19 kg of an Octastat 2000 solution in pentane (2 g/l) was added and the mixture was finally dried at 60° C. under vacuum. 428 kg of silica/TEA were obtained. The aluminium content of the solid was found to be 1.3 mmol/g.

(b) Preparation of Catalyst Component 1

To 216.9 kg of a 9.58% solution of [N(H)Me($C_{18-22}$ $H_{37-45}$)$_2$][B($C_6F_5$)$_3$(p-OH$C_6H_4$)] (Ionic Compound A) in toluene were added over 15 minutes 17.75 kg of 11.7% TEA solution in isohexane. The mixture was further stirred for 15 minutes to yield a solution of catalyst component 1.

(c) Preparation of a Mixture of ($C_5Me_4SiMe_2N^tBu$) Ti($\eta^4$-1,3-pentadiene) (Complex A with 1-hexene To 53.0 kg of a 11.6% solution of Complex A in heptane were added 47.8 kg of 1-hexene.

(d) Preparation of the Supported Catalyst 288 kg of the above prepared silica/TEA was introduced into a reactor. The above prepared solution of catalyst component 1 was fed to the reactor over 45 minutes and the mixture was then stirred for further 30 minutes. The contents of the reactor were then cooled to 15° C. and the above prepared solution of Complex A and 1-hexene was fed over a period of 30 minutes, and then the mixture was further stirred for 1 hour. During the addition the internal temperature increased to a maximum of 23° C. 34 kg of an Octastat 2000 solution in pentane (2 g/l) was then added and the mixture was dried at 45° C. until the residual solvent content in the catalyst was <1%.
Analysis of the resulting dry powder showed the titanium content to be 44.0 μmol/g, the boron content to be 53.7 μmol/g and the aluminium content to be 1.02 mmol/g.

2—Polymerisation

The copolymers according to the present invention were prepared by copolymerisation of ethylene with hexene in a gas phase fluidized bed reactor having a 0.74 m diameter and using the catalyst system prepared above. Detailed process conditions are summarized in Table 1.
The polyethylene powder was compounded under nitrogen atmosphere on a ZSK58 extruder with the following additive package: to 99.5 parts of the polyethylene composition, 0.1 part of Irgafos™ 168, 0.25 part of Irganox™ 1330, 0.05 part of zinc oxide and 0.1 part of Evernox™ MD1024 were added.
The resulting product was submitted to detailed characterization as summarized in Table 2.

Examples 2 to 5

Polymerisation and pelletisation were carried out under the conditions described in example 1, and the detailed process conditions for each example are summarized in Table 1. Analysis and characterization are also summarized in Table 2.

Comparative Example 6

Polymerisation and pelletisation were carried out under the conditions described in example 1 to prepare a copolymer of higher melt index with the detailed process conditions again summarized in Table 1 with the analysis and characterization summarized in Table 2.

Comparative Example 7

A polyethylene composition was prepared under the conditions of example 1, but a Ziegler catalyst, prepared substantially according to example 1 of EP 998503, was used instead of the catalyst of examples 1 to 6.

Comparative Example 8

A commercial bimodal polyethylene copolymer used in hot and cold water pipe applications and sold by the Dow Chemical Company under the trade name Dowlex™ 2388.

TABLE 1

| Examples | | 1 | 2 | 3 | 4 |
|---|---|---|---|---|---|
| Temperature | ° C. | 85 | 85 | 84 | 83 |
| Total pressure | bar | 20.3 | 20.3 | 20.2 | 20.2 |
| Bed height | m | 5.5 | 5.7 | 5.7 | 5.7 |
| Ethylene partial pressure | bar | 13.5 | 13.4 | 13.1 | 13 |
| Hydrogen/ethylene ratio | mol/mol | 0.0017 | 0.0017 | 0.0019 | 0.0020 |
| Hexene/ethylene ratio | mol/mol | 0.0022 | 0.0019 | 0.0025 | 0.0024 |
| Pentane partial pressure | bar | 2.5 | 3.3 | 3.2 | 3.3 |
| Residence time | h | 3.5 | 3.6 | 4.5 | 4.6 |
| Space time yield | kg/h/m³ | 67.7 | 85 | 69 | 69.1 |
| Stadis 425 | ppm | 10 | 10 | 10 | 9 |

| Examples | | 5 | CE 6 | CE 7 |
|---|---|---|---|---|
| Temperature | ° C. | 83 | 85 | 85 |
| Total pressure | bar | 20.3 | 20.3 | 20.7 |
| Bed height | m | 5.7 | 5.5 | 5.5 |
| Ethylene partial pressure | bar | 12.9 | 13.5 | 9.9 |
| Hydrogen/ethylene ratio | mol/mol | 0.0020 | 0.0025 | 0.22 |
| Hexene/ethylene ratio | mol/mol | 0.0025 | 0.0029 | 0.15 |
| Pentane partial pressure | bar | 3.2 | 1.5 | 1.5 |
| Residence time | hour | 5.3 | 3.5 | 3.5 |
| Space time yield | kg/h/m³ | 56.9 | 85 | 80 |
| Stadis 425 | ppm | 11 | 10 | 0 |

Determination of Polymer Properties
Density (D) of the polyethylene was measured according to ISO 1183-1 (Method A) and the sample plaque was prepared according to ASTM D4703 (Condition C) where it was cooled under pressure at a cooling rate of 15° C./min from 190° C. to 40° C.
Melt index MI$_2$ and HLMI were measured using the procedures of ISO 1133 at 190° C. using loads of 2.16 and 21.6 kg, respectively.
Dynamic Rheological Analysis
Rheological measurements were carried out on an oscillatory rheometer (e.g., Rheometrics RDS-2, ARES) with 25 mm diameter parallel plates in a dynamic mode under an inert (nitrogen) atmosphere. For all experiments, the rheometer was thermally stable at 190° C. for at least 30 minutes before inserting the appropriately stabilised (with antioxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.
Two strain sweep (SS) experiments were initially carried out at 190° C. under nitrogen to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain under nitrogen (as determined by the SS experiments) to check the stability of the sample during testing.

The frequency sweep (FS) experiment was then carried out at 190° C. using the above appropriately selected strain level between dynamic frequencies range of $10^{-2}$ to 100 rad/s under a nitrogen atmosphere. The complex dynamic shear viscosities, $\eta^*(100)$ in Pa·s, at dynamic frequency of 100 rad/s, and $\eta^*(0.1)$, at a dynamic frequency of 0.1 rad/s, were determined directly from the viscosity data of the frequency sweep (FS) experiment measured at 190° C.

Measurement of Melt Elastic Modulus G'(G"=500 Pa) at 190° C.

The frequency sweep (ES) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

Gel Permeation Chromatography Analysis for Molecular Weight Distribution Determination Apparent molecular weight distribution and associated averages, uncorrected for long chain branching, were determined by Gel Permeation Chromatography using a PL220, with 4 Waters HMW 6E columns and a differential refractometer detector. The solvent used was 1,2,4 Trichlorobenzene at 145° C., which is stabilised with BHT, of 0.2 g/liter concentration and filtered with a 0.45 µm Osmonics Inc. silver filter. Polymer solutions of 1.0 g/liter concentration were prepared at 160° C. for one hour with stirring only at the last 30 minutes. The nominal injection volume was set at 400 µl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters $k_{ps}=1.21\times10^{-4}$, $\alpha_{ps}=0.707$, $k_{pe}=3.92\times10^{-4}$, $\alpha_{pe}=0.725$. The calibration curve $Mw_{PE}=f(V)$ was then fitted with a first order linear equation. All the calculations are done with Empower Pro software from Waters.

The very low molecular weight fractions (below 1000 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

Compression Molding Method for Tensile Creep and Dynamic Mechanical Thermal Analysis (DMTA) Samples Plaques for specimen preparation were moulded by compression according to ISO 293:1996 (Plastics. Compression moulding test specimens of thermoplastic materials) using a 'Collin P300M' hydraulic press. Sample moulding program is as followed:

Application of pressure of 2 bars during 10 minutes. During this period, the mould is heated up to 190° C. at a rate of 20° C./min A pressure of 50 bars is then applied during 5 minutes at 190° C., then a pressure or 150 bars was applied for a period of 3 minutes Sample is cooled down at a controlled speed of 15° C./minute under this pressure.

Samples are removed once the temperature is below 35° C.

Tensile Creep at High Temperature

Tensile creep tests were carried out in accordance to ISO 899-1: 2003 using ISO-1B type specimens. The specimens were cut from compressed moulded plaques (4 mm thickness, similarly prepared as above) and machined according to the teachings of ISO02818 standard. After machining, the specimens are observed and dimensions are measured according to ISO 527-1:1993. Specimen dimensions are reported in Table 4.

The specimens were tested at a constant stress of 2 MPa at 95° C. in air over a period of 1000 hours, and the deformation was monitored as a function of time, using mechanical extensometers. The full strain—time curve and deformation measured after 10, 100 and 500 hours are recorded.

Dynamic Mechanical Thermal Analysis (DMTA)

Dynamic mechanical thermal analysis is a widely used technique (see, e.g., K. P. Menard, *Dynamic Mechanical Analysis—A Practical Introduction*, CRC Press, 1999, ISBN 0-8493-8688-8) for the measurements of the viscoelastic properties (e.g., the complex dynamic moduli, E*) of polymer in an oscillatory mechanical deformation experiment during a programmed temperature scan at controlled frequency ($\omega$). A sinusoidal deformation (e.g., a sinusoidal strain $\epsilon(\omega)$) is usually imposed on the sample, which can be mounted to bend, (cantilever bending), expand or contract (tensile mode) or shear if the material modulus is relatively low.

The technique determines how a material behaves when subjected to dynamic loading under a wide range of frequencies of vibration, over a wide temperature interval. The DMTA also has a frequency multiplexing capability which can be used for calculating activation energies using time-temperature superposition principle and software.

When a viscoelastic material is subjected to dynamic loading (e.g., a sinusoidal strain $\epsilon(\omega)=\epsilon_1 \cdot \sin[\omega t]$, where $\omega$ is the angular applied frequency), the stress response ($\sigma(\omega)=\sigma_1 \cdot \sin[\omega t+\delta]$) will lead the strain by a phase angle termed $\delta$. For convenience, the stress is resolved into two components; a component (real part) which occurs entirely in phase with the strain, and a component (imaginary part) which is out of phase by 90 degrees. Based on these stress components it is possible to derive modulus values; the in phase (storage) modulus is termed E', the out of phase (loss) modulus is termed E" and the composite modulus, called the complex or dynamic modulus is E*. A convenient measure of the viscoelastic behaviour of a material is the loss (or damping) factor, tan δ, which is numerically equal to E"/E'.

A typical DMTA scan measures E', E", E* and tan δ over a range of oscillatory frequencies and temperatures. Thermograms are usually plotted to show elastic modulus, E', and tan δ versus temperature, and major molecular relaxations are clearly visible as peaks on the plot of tan δ versus temperature.

For the current invention, all dynamic viscoelastic measurements were performed on an EPLEXOR® 500N instrument (supplied by GABO QUALIMETER Testanlagen GmbH) in a tensile mode using a force sensor of 150 N. In general, the method of measurements follows closely to the ISO 6721—Part 1: 2001 and Part 4: 1994, except using a single specimen with sample dimensions of 55 mm in length, 6.5 mm in width and 1.5 mm in thickness cut from a compressed moulded sheet as previously described. However, the length of the specimen between the sample jaws ($L_0$) was set at 30 mm during the measurements.

Before the measurements, the DMTA instrument (transducer, alignment of the sample jaws, temperature sensors and controls, etc.) is appropriately calibrated in accordance to the instructions of the instrument manufacturer.

The measurements involve multi-frequency sweeps (within the linear viscoelastic regime) at 8 discrete frequencies (namely, 0.1, 0.23, 0.51, 1.15, 2.60, 5.88, 13.28, 30 Hz) in the range of 0.1 to 30 Hz at temperatures starting from 20° C. to 130° C., under nitrogen atmosphere. After each test, the temperature is set 5° C. higher and following a controlled heating rate of 1° C./min. To achieve thermal equilibrium conditions the next frequency sweep is started after a waiting time of 600 s at the new temperature. This procedure is repeated continuously until the temperature is just below the melting point, namely 130° C. The data resulting from these chosen frequencies, e.g., 0.1 Hz, are then plotted as a function of the temperature.

During the measurements, the sample was subjected to a static tensile strain ($\epsilon_0$=0.12%) in order to place the sample under tension. A small dynamic strain, $\epsilon_1$=0.05%, was then imposed to ensure linear viscoelastic behaviour of the specimen during the axial sinusoidal oscillation measurements at each temperature.

Determination of Activation Frequency (a) Minimum Slope of Tan δ at 0.1 Hz, Between 85 and 125° C.

From each of the thermograms of tan δ versus temperature thus plotted for the 8 discrete frequencies as mentioned above, the derivatives, $$\frac{\partial \tan\delta}{\partial T}(T_i + 2.5° \text{ C.}),$$

at every 5° C. from 20° to 130° C. can be determined in accordance with the following equation (1):

$$\frac{\partial \tan\delta}{\partial T}(T_i + 2.5° \text{ C.}) = \frac{[\tan\delta(T_i + 5° \text{ C.}) - \tan\delta(T_i)]}{[(T_i + 5° \text{ C.}) - (T_i)]} \quad (1)$$

where $T_i$ equals to 20, 25, 30, . . . , 120, 125, 130° C., giving $$\frac{\partial \tan\delta}{\partial T}(T_i + 2.5° \text{ C.})$$

values starting at T=20+2.5° C.=22.5° C., to T=125+2.5° C. For example, from the spectrum of tan δ(T) at 0.1 Hz, the first derivative value at T=22.5° C. is calculated as:

$$\frac{\partial \tan\delta}{\partial T}(22.5° \text{ C.}) = \frac{[\tan\delta(25° \text{ C.}) - \tan\delta(20° \text{ C.})]}{[25° \text{ C.} - 20° \text{ C.}]};$$

And the process is repeated at every 5° C., giving the next derivative at T=27.5° C. as, $$\frac{\partial \tan\delta}{\partial T}(27.5° \text{ C.}) = \frac{[\tan\delta(30° \text{ C.}) - \tan\delta(25° \text{ C.})]}{[30° \text{ C.} - 25° \text{ C.}]}; \ldots, \text{ etc.}$$

From these thus calculated derivatives, or slopes, of the tan δ(T) spectrum at each of the 8 discrete frequencies tested, the lowest value occurred between 85 to 115° C. is then determined.

For example, this lowest slope of the tan δ(T) spectrum at 0.1 Hz will be noted as:

$$\min\left[\frac{\partial \tan\delta}{\partial T}(T_1 + 2, 5)\right]_{T_1 \in [85-115° \text{ C.}]/f=0.1 \text{ Hz}}$$

It should be noted that the term 'lowest' means lowest in value: for instance, a negative slope of −4 will be considered lower than a positive slope of 0.3. In this case, the value −4 will be considered as the lowest.

(b) Critical Frequency of Activation of High Temperature Performances

The calculation and determination of the minimum slope demonstrated above for a frequency of 0.1 Hz can be generalized to the other 7 discrete frequencies tested: 0.23, 0.51, 1.15, 2.60, 5.88, 13.28, 30 Hz:

$$\min\left[\frac{\partial \tan\delta}{\partial T}(T_1 + 2, 5)\right]_{T_1 \in [85-115° \text{ C.}]/f=0.23 \text{ Hz}}$$

$$\min\left[\frac{\partial \tan\delta}{\partial T}(T_1 + 2, 5)\right]_{T_1 \in [85-115° \text{ C.}]/f=0.51 \text{ Hz}}$$

$$\min\left[\frac{\partial \tan\delta}{\partial T}(T_1 + 2, 5)\right]_{T_1 \in [85-115° \text{ C.}]/f=13 \text{ Hz}}$$

$$\min\left[\frac{\partial \tan\delta}{\partial T}(T_1 + 2, 5)\right]_{T_1 \in [85-115° \text{ C.}]/f=30 \text{ Hz}}$$

These minimum derivatives values thus obtained are then plotted against the corresponding 8 frequencies between 0.1-30 Hz, with the Y-axis defined by the values of $$\min\left[\frac{\partial \tan\delta}{\partial T}(T_1 + 2, 5)\right]_{T_1 \in [85-115° \text{ C.}]/f},$$

and the X-axis defined by the frequency (f).

A critical activation frequency appropriating the high temperature relaxation and performances ($f_{C\text{-}HT}$) of the polymer is then defined as the interception (whenever it exists) at the X-axis of the best fit to the equation (2) based on the minimum derivatives values between 0.1 and 2.6 Hz.

$$A \cdot \text{Ln(frequency)} + B = \min\left[\frac{\partial \tan\delta}{\partial T}(T_1 + 2, 5)\right]_{T_1 \in [85-115^\circ C.]/f} \quad (2)$$

Namely, $f_{C\text{-}HT}$ is therefore the frequency (in Hz) that corresponds to:

$$\min\left[\frac{\partial \tan\delta}{\partial T}(T_1 + 2, 5)\right]_{T_1 \in [85-115^\circ C.]/f_{C\text{-}HT}} = 0 \quad (3)$$

If equation (3) is never satisfied in the range of frequency from 0.1 to 30 Hz (no interception between the considered plot and the X-axis), then it is said that the particular product thus tested does not present a critical frequency of activation of high temperature performances between 0.1 and 30 Hz.

The present invention describes polymers that have a critical frequency (in Hz) of activation of high temperature performances characterised by the equations:

$$f_{C\text{-}HT} \geq 0.85\eta^*(0.1)/\eta^*(100) - 0.8 \quad (g)$$

$$f_{C\text{-}HT} > 2.0 \quad (h)$$

Pipe Creep resistance was evaluated on 50 mm SDR 17 pipes produced on a Krauss-Maffei extrusion line according to ISO 1167. The pipe pressure resistance has been measured at 20', 80, 95 and 110° C. under different hoop stresses. Tests were carried out in a "water-in-water" medium for temperatures of 20 and 80° C., and in a "water-in-air" medium for temperatures of 95 and 110° C.

Results are summarized in Table 5, where the values are averaged from the failure times of two pipes tested.

TABLE 2

| Polymer Properties | | | | | |
|---|---|---|---|---|---|
| Examples | | 1 | 2 | 3 | 4 |
| MI2 | g/10 min | 1.07 | 1.62 | 1.78 | 1.50 |
| HLMI | g/10 min | 25 | | | |
| Density | kg/m³ | 936.1 | 939.2 | 937.6 | 938.1 |
| Dynamic viscosity at 100 rad/s, $\eta^*(100)$ | Pa · s | 1751 | 1497 | 1460 | 1456 |
| Dynamic viscosity at 0.1 rad/s, $\eta^*(0.1)$ | Pa · s | 7208 | 4967 | 4725 | 5218 |
| $\eta^*(0.1)/\eta^*(100)$ ratio | — | 4.12 | 3.32 | 3.24 | 3.58 |
| G' (G" = 500 Pa) | Pa | 58.6 | 44.0 | 46.4 | 50.0 |
| Mw | kDa | 115.1 | 102.6 | 100.9 | 103.8 |
| Mn | kDa | 28 | 26.3 | 27.5 | 24.8 |
| Mw/Mn | | 4.1 | 3.9 | 3.7 | 4.2 |
| d(tanδ)/dT Min @ 0.1 Hz | | — | −4.16 | −4.49 | −3.98 | −5.23 |
| d(tanδ)/dT Min @ 0.22 Hz | | — | −3.57 | −3.57 | −3.36 | −3.05 |
| d(tanδ)/dT Min @ 0.51 Hz | | — | −2.44 | −2.04 | −2.41 | −2.42 |
| d(tanδ)/dT Min @ 1.15 Hz | | — | −1.61 | −0.94 | −1.26 | −1.39 |
| d(tanδ)/dT Min @ 2.6 Hz | | — | −0.53 | −0.46 | −0.34 | −0.26 |
| Activation frequency as defined by A · Ln(frequency) + B = [min(d(tanδ)/dT)] = 0 | Hz | 4.49 | 2.95 | 3.65 | 2.90 |

| Examples | | 5 | CE 6 | CE 7 | CE 8 |
|---|---|---|---|---|---|
| MI2 | g/10 min | 2.65 | 5.80 | 1.10 | 0.85 |
| Density | kg/m³ | 939.0 | 937.8 | 936.0 | 941 |
| Dynamic viscosity at 100 rad/s, $\eta^*(100)$ | Pa · s | 1039 | 552 | 1759 | 1521 |
| Dynamic viscosity at 0.1 rad/s, $\eta^*(0.1)$ | Pa · s | 2912 | 1198 | 8541 | 13811 |
| $\eta^*(0.1)/\eta^*(100)$ ratio | — | 2.80 | 2.17 | 4.86 | 9.08 |
| G' (G" = 500 Pa) | Pa | 45.1 | 28.0 | 37.6 | 110.1 |
| Mw | kDa | 89.2 | | 135.7 | 116.7 |
| Mn | kDa | 21.8 | | 31.9 | 24.1 |
| Mw/Mn | | 4.1 | 3.9 | 4.3 | 4.8 |
| d(tanδ)/dT Min @ 0.1 Hz | | — | −3.39 | −2.20 | −0.94 | −4.28 |
| d(tanδ)/dT Min @ 0.22 Hz | | — | −3.05 | −0.98 | 0.56 | −3.43 |
| d(tanδ)/dT Min @ 0.51 Hz | | — | −1.70 | −0.19 | 1.25 | −2.37 |
| d(tanδ)/dT Min @ 1.15 Hz | | — | −0.63 | 0.61 | 2.39 | −1.44 |
| d(tanδ)/dT Min @ 2.6 Hz | | — | 0.18 | 1.27 | 2.19 | −0.61 |
| Activation frequency as defined by A · Ln(frequency) + B = [min(d(tanδ)/dT)] = 0 | Hz | 2.21 | 0.56 | 0.74 | 4.26 |

The compositions according to the invention exhibit good processability during pipe extrusions as illustrated by the viscosity at high shear rate.

Moreover, without wishing to be bound by theory, the excellent mechanical properties at high temperature are believed to be strongly linked to the high critical frequencies as measured by DMTS analysis: the higher activation frequency, the slower the deformation of the material as measured by creep testing at 95° C. (Table 3), and the longer the time to failure during hydrostatic tests performed on pipe articles (Table 5).

TABLE 3

| Examples | 1 | 2 | 3 | 4 |
|---|---|---|---|---|
| MI2 (g/10 min) | 1.07 | 1.62 | 1.78 | 1.5 |
| Density (kg/m³) | 936.1 | 939.2 | 937.6 | 938.1 |
| Strain after 10 h (%), [ε (10 h)]: Creep testing under 2 MPa at 95° C. | 2.85 | 2.58 | 2.87 | 2.73 |
| Strain after 100 h (%), [ε (100 h)]: Creep testing under 2 MPa at 95° C. | 3.20 | 2.84 | 3.18 | 3.01 |
| Strain after 500 h (%), [ε (500 h)]: Creep testing under 2 MPa at 95° C. | 3.31 | 2.99 | 3.30 | 3.18 |

| Examples | 5 | CE 6 | CE 7 | CE 8 |
|---|---|---|---|---|
| MI2 (g/10 min) | 2.65 | 5.8 | 1.1 | 0.85 |
| Density (kg/m³) | 939 | 937.8 | 936.0 | 941.0 |
| Strain after 10 h (%), [ε (10 h)]: Creep testing under 2 MPa at 95° C. | 2.63 | 3.40 | 3.27 | 2.83 |
| Strain after 100 h (%), [ε (100 h)]: Creep testing under 2 MPa at 95° C. | 2.91 | 3.90 | 3.60 | 3.20 |
| Strain after 500 h (%), [ε (500 h)]: Creep testing under 2 MPa at 95° C. | 3.09 | 4.18 | 3.83 | 3.35 |

The compositions according to the invention are also characterized by smaller deformation as measured by creep testings at high temperature (95° C.) under 2 MPa stress.

TABLE 4

| Creep Test Sample dimension and test conditions | | | | |
|---|---|---|---|---|
| Examples | 1 | 2 | 3 | 4 |
| Gauge Length (mm) | 50.01 | 50.05 | 50.04 | 50.02 |
| Width (mm) | 10.39 | 10.01 | 10.01 | 10.01 |
| Thickness (mm) | 4.08 | 4.13 | 4.11 | 4.10 |
| Section (mm²) | 42.347 | 41.317 | 41.173 | 41.085 |
| Stress (MPa) | 2.000 | 2.000 | 2.000 | 2.000 |
| Load (kg) | 8.633 | 8.423 | 8.394 | 8.376 |

| Examples | 5 | CE 6 | CE 7 | CE 8 |
|---|---|---|---|---|
| Gauge Length (mm) | 50.00 | 50.09 | 49.98 | 50.00 |
| Width (mm) | 10.01 | 9.93 | 9.80 | 10.05 |
| Thickness (mm) | 4.05 | 3.92 | 3.89 | 4.07 |
| Section (mm²) | 40.516 | 38.884 | 38.089 | 40.891 |
| Stress (MPa) | 2.000 | 2.000 | 2.000 | 2.000 |
| Load (kg) | 8.260 | 7.928 | 7.766 | 8.337 |

TABLE 5

| Examples Temperature (° C.) | Hoop stress (MPa) | Failure time (h) | | | |
|---|---|---|---|---|---|
| | | 1 | 2 | 3 | 4 |
| 20 | 10.8 | n.t. | 2262 | 185 | 338 |
| 20 | 10.5 | n.t. | n.t. | n.t. | n.t. |
| 20 | 10.4 | n.t. | >10010 | >9148 | >10010 |
| 80 | 5.5 | n.t. | >7657 | 25 | 297 |
| 80 | 5.4 | 145 | n.t. | n.t. | n.t. |
| 80 | 5.3 | n.t. | >10177 | >3697 | >10176 |
| 80 | 5.2 | >13501 | n.t. | n.t. | n.t. |
| 80 | 5.1 | >16227 | n.t. | n.t. | n.t. |
| 80 | 4.7 | >12607 | n.t. | n.t. | n.t. |
| 95 | 4.4 | n.t. | 1254 | 285 | 1153 |
| 95 | 4.2 | n.t. | >9506 | >2602 | >7815 |
| 95 | 4 | >8768 | n.t. | n.t. | n.t. |
| 95 | 3.8 | >6318 | n.t. | n.t. | n.t. |
| 95 | 3.6 | >6354 | n.t. | n.t. | n.t. |
| 110 | 2.9 | n.t. | >988 | 21 | 43 |
| 110 | 2.7 | 1625 | n.t. | n.t. | n.t. |
| 110 | 2.6 | n.t. | >3452 | 3253 | 801 |
| 110 | 2.5 | 2295 | n.t. | n.t. | n.t. |
| 110 | 2.3 | n.t. | >3683 | >3693 | >3676 |

| Examples Temperature (° C.) | Hoop stress (MPa) | Failure time (h) | | |
|---|---|---|---|---|
| | | 5 | CE. 7 | CE 8 |
| 20 | 10.8 | >10010 | n.t. | 540 |
| 20 | 10.5 | n.t. | n.t. | 7282 |
| 20 | 10.4 | >10010 | n.t. | n.t. |
| 80 | 5.5 | 1575 | n.t. | 539 |
| 80 | 5.4 | n.t. | n.t. | n.t. |
| 80 | 5.3 | >10179 | n.t. | n.t. |
| 80 | 5.2 | n.t. | 3 | n.t. |
| 80 | 5.1 | n.t. | n.t. | n.t. |
| 80 | 4.7 | n.t. | 7079 | n.t. |
| 95 | 4.4 | 1011 | n.t. | n.t. |
| 95 | 4.2 | >7343 | n.t. | n.t. |
| 95 | 4 | n.t. | 198 | n.t. |
| 95 | 3.8 | n.t. | n.t. | n.t. |
| 95 | 3.6 | n.t. | n.t. | n.t. |
| 110 | 2.9 | 25 | n.t. | n.t. |
| 110 | 2.7 | n.t. | 8 | n.t. |
| 110 | 2.6 | >3694 | n.t. | n.t. |
| 110 | 2.5 | n.t. | 15 | >2100 |
| 110 | 2.3 | >3688 | n.t. | n.t. |

Note:
Unless otherwise specified in the table, only ductile mode failures are observed for these testings. n.t. indicates that the composition has not been tested under these conditions. ">": means product did not fail (test has been stopped or is still on-going)

The results of the pipe testings indicate that the composition according to the invention exhibit excellent pressure resistance at high temperature. Particularly, it fulfils the requirements of standard DIN 16833 (minimum 165 h at 95° C. under a hoop stress of 3.6 MPa) and those of EN ISO 22391 (failure times markedly higher than 1000 h both at 95° C. under a hoop stress of 4.0 MPa, and at 80° C. under a hoop stress of 5.2 MPa). The advantage of the inventive composition is shown by the comparison of the results obtained with Example 1 and Comparative Example 7 (products of similar melt-index and density). In addition, the comparison of Examples 2 or 5 with the Comparative Example 8 demonstrates also an improved long term hydrostatic strength (LTHS) of the inventive compositions, despite their lower density and their higher MI2.

With respect to the MRS classification (Minimum Required Strength at 20° C. for 50 years) according to standard ISO12162, the time to failure recorded for examples in Table 5 at 20° C. indicate that the inventive compositions can exceed the performance of commercial PE80 polyethylenes having a MRS classification of 8.0 MPa. Regarding testings at 80° C., the failure times for inventive compositions largely exceed the performance of the same PE80 materials having a MRS classification of 8.0 MPa or above.

The invention claimed is:

1. A copolymer of ethylene and an alpha-olefin said copolymer having
   (a) a density (D) in the range 930-945 kg/cm$^3$,
   (b) a melt index (MI$_2$) in the range 0.1-3.5 g/10 min,
   (c) a melt elastic modulus G' (G"=500 Pa) in the range 40-150 Pa, and
   (d) a ratio of complex dynamic shear viscosities $\eta^*(0.1)/\eta^*(100)$ in the range 1.5-5.5,
   said copolymer having the relationship:

$\epsilon$ (100 h)$\leq$-0.0919$D$+89.5 wherein D is the density and $\epsilon$ (100 h) is the measured strain (%) after 100 h of tensile creep test at 95° C. under a constant stress of 2 MPa, and
   wherein said copolymer is used in hot water pipe applications.

2. A copolymer of ethylene and an alpha-olefin according to claim 1 having a melt elastic modulus in the range 40-100 Pa.

3. A copolymer of ethylene and an alpha-olefin according to claim 2 having a melt elastic modulus in the range 40-70 Pa.

4. A copolymer of ethylene and an alpha-olefin according to claim 1 having a ratio of complex dynamic shear viscosities in the range 2.0-5.0.

5. A copolymer of ethylene and an alpha-olefin according to claim 4 having a ratio of complex dynamic shear viscosities in the range 2.5-4.5.

6. A copolymer of ethylene and an alpha-olefin according to claim 1 having a melt index (MI$_2$) in the range 1.0-3.0.

7. A copolymer of ethylene and an alpha-olefin according to claim 6 having a melt index (MI$_2$) in the range 1.0-1.5.

8. A copolymer of ethylene and an alpha-olefin according to claim 1 having a molecular weight distribution (Mw/Mn) in the range 3.5-10.

9. A copolymer of ethylene and an alpha-olefin according to claim 1 having the relationship:

$f_{C\text{-}HT} \geq 0.85[\eta^*(0.1)/\eta^*(100)]-0.8$ wherein $\eta^*(0.1)/\eta^*(100)$ is as defined before and $F_{C\text{-}HT}$ represents the critical frequency (Hz) of activation of high temperature performance.

10. A copolymer of ethylene and an alpha-olefin according to claim 9 wherein $f_{C\text{-}HT} \geq 2$ Hz.

11. A copolymer of ethylene and an alpha-olefin according to claim 1 wherein the alpha-olefin has C4-C10 carbon atoms.

12. A copolymer of ethylene and an alpha-olefin according to claim 11 wherein the alpha-olefin is 1-hexene.

13. A copolymer of ethylene and an alpha-olefin according to claim 1 having a unimodal composition distribution.

14. A copolymer of ethylene and an alpha-olefin according to claim 1 prepared by use of a single site catalyst.

15. A copolymer of ethylene and an alpha-olefin according to claim 14 prepared by use of a metallocene catalyst system.

16. A copolymer of ethylene and an alpha olefin according to claim 15 wherein the metallocene complex has the general formula:

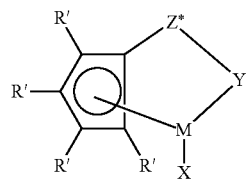

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a $\pi$-complex with M;
Y is —O—, —S—, —NR*—, —PR*—,
M is titanium or zirconium in the +2 formal oxidation state;
Z* is SiR*$_2$, CR*$_2$, SiR*$_2$SiR*$_2$, CR*$_2$CR*$_2$, CR*=CR*, CR*$_2$SiR*$_2$, or
GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

17. A copolymer of ethylene and an alpha-olefin according to claim 1 having a density in the range 934-938 kg/cm$^3$.

18. A copolymer of ethylene and an alpha-olefin said copolymer having
   (a) a density (D) in the range 930-945 kg/cm$^3$,
   (b) a melt index (MI$_2$) in the range 0.1-3.5 g/10 min,
   (c) a melt elastic modulus G' (G"=500 Pa) in the range 40-150 Pa, and
   (d) a ratio of complex dynamic shear viscosities $\eta^*(0.1)/\eta^*(100)$ in the range 1.5-5.5,
   said copolymer having the relationship:

$\epsilon$(500 h)$\leq$-0.124$D$+119.75 wherein D is the density and $\epsilon$ (500 h) is the measured strain (%) after 500 h of tensile creep test at 95° C. under a constant stress of 2 MPa.

19. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a balance of high temperature creep resistance and products flexibility performance characterized by the equation, $$\epsilon(100\ h) \leq -0.0919D + 89.5$$

where D is the density (in kg/m$^3$) and $\epsilon(100\ h)$ is the measured strain (in %) after 100 hours of tensile creep test at 95° C., under a constant stress of 2 MPa, wherein said copolymer is used in hot water pipe applications.

20. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a balance of high temperature creep resistance and products flexibility performance characterized by the equation, $$\epsilon(100\ h) \leq -0.135D + 129.86$$

where D is the density (in kg/m$^3$) and $\epsilon(100\ h)$ is the measured strain (in %) after 100 hours of tensile creep test at 95° C., under a constant stress of 2 MPa, wherein said copolymer is used in hot water pipe applications.

21. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a balance of high temperature creep resistance and products flexibility performance characterized by the equation, $$\epsilon(500\ h) \leq -0.124D + 119.75$$

where D is the density (in kg/m$^3$) and $\epsilon(500\ h)$ is the measured strain (in %) after 500 hours of tensile creep test at 95° C., under a constant stress of 2 MPa, wherein said copolymer is used in hot water pipe applications.

22. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a balance of high temperature creep resistance and products flexibility performance characterized by the equation, $$\epsilon(500\ h) \leq -0.149D + 143.2$$

where D is the density (in kg/m$^3$) and $\epsilon(500\ h)$ is the measured strain (in %) after 500 hours of tensile creep test at 95° C., under a constant stress of 2 MPa, wherein said copolymer is used in hot water pipe applications.

23. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a critical frequency (in Hz) of activation of high temperature performances characterised by the equations:

$$f_{C\text{-}HT} \geq 0.85 \eta^*(0.1)/\eta^*(100) - 0.8$$

wherein said copolymer is used in hot water pipe applications.

24. A copolymer of ethylene and alpha-olefins said copolymer having
(a) a density (D) in the range 930-945 kg/m$^3$,
(b) a melt index (MI$_2$) in the range 0.1-3.5 g/10 min,
(c) a critical frequency (in Hz) of activation of high temperature performances characterised by the equations:

$$f_{C\text{-}HT} > 2.0$$

wherein said copolymer is used in hot water pipe applications.

* * * * *